United States Patent
Wong et al.

[11] Patent Number: 5,869,196
[45] Date of Patent: Feb. 9, 1999

[54] CONSTRAINED FILAMENT ELECTROLYTIC ANODE AND PROCESS OF FABRICATION

[75] Inventors: James Wong, Wayland; Mark K. Rudziak, Westminister; Terence Wong, Cambridge, all of Mass.

[73] Assignee: Composite Material Technology, Inc., Shrewsbury, Mass.

[21] Appl. No.: 931,145

[22] Filed: Sep. 16, 1997

Related U.S. Application Data

[63] Continuation-in-part of Ser. No. 781,962, Dec. 20, 1996, and Ser. No. 844,062, Apr. 18, 1997.

[51] Int. Cl.$^6$ .................................. B32B 5/18; H01G 9/04
[52] U.S. Cl. ........................ 428/613; 428/660; 428/662; 29/592.1; 72/274; 72/275; 361/508; 361/509; 361/528; 361/529
[58] Field of Search .................................. 428/660, 662, 428/613; 361/508, 509, 528, 529; 29/DIG. 11, 592.1; 72/274, 275

[56] References Cited

U.S. PATENT DOCUMENTS

| | | | |
|---|---|---|---|
| 2,653,869 | 9/1953 | Gregory et al. | 75/84 |
| 3,567,407 | 3/1971 | Yoblin | 29/191.4 |
| 3,627,520 | 12/1971 | Rogers | 75/222 |
| 3,697,255 | 10/1972 | Baldwin et al. | 75/0.5 |
| 3,825,802 | 7/1974 | Kumagai et al. | 317/230 |
| 3,859,086 | 1/1975 | Church et al. | 75/211 |
| 4,009,007 | 2/1977 | Fry | 29/182.5 |
| 4,041,359 | 8/1977 | Mizushima et al. | 361/433 |
| 4,262,412 | 4/1981 | McDonald | 29/599 |
| 4,414,428 | 11/1983 | McDonald | 174/126 |
| 4,483,819 | 11/1984 | Albrecht et al. | 419/2 |
| 4,537,641 | 8/1985 | Albrecht et al. | 148/11.5 |
| 4,544,403 | 10/1985 | Schiele et al. | 75/0.5 |
| 4,548,672 | 10/1985 | Albrecht et al. | 156/646 |
| 4,569,693 | 2/1986 | Albrecht et al. | 75/252 |
| 4,582,530 | 4/1986 | Heinrich et al. | 75/0.5 |
| 4,645,533 | 2/1987 | Izumi | 75/0.5 |
| 4,722,756 | 2/1988 | Hard | 148/126.1 |
| 4,957,541 | 9/1990 | Tripp et al. | 75/245 |
| 4,973,527 | 11/1990 | Smathers | 428/930 |
| 5,242,481 | 9/1993 | Kumar | 75/364 |
| 5,245,514 | 9/1993 | Fife et al. | 361/529 |
| 5,448,447 | 9/1995 | Chang | 361/529 |

FOREIGN PATENT DOCUMENTS 543135  7/1957  Canada .

*Primary Examiner*—Paul Thibodeau
*Assistant Examiner*—Holly C. Rickman
*Attorney, Agent, or Firm*—Hayes, Soloway, Hennessey, Grossman & Hage, P.C.

[57] ABSTRACT

Porous metal compacts suitable for use as electrodes are formed through the reduction of a metal billet consisting of multiple filaments of an appropriate valve metal, preferably tantalum, contained within, and spaced apart by, a ductile metal, preferably copper. The filaments are elongated and substantially parallel within the billet. The array of valve metal filaments within the billet is surrounded by a continuous layer of valve metal. This metal is preferably, but not necessarily, the same as that which forms the filaments. The valve metal layer preferably completely surrounds the filament array circumferentially and runs the full length of the filaments. The layer is separated from the array by the same ductile metal that serves to separate the filaments from each other. This same ductile metal forms the surface of the billet, preventing exposure of the valve metal layer. The billet is reduced by conventional means, such as extrusion and wire drawing, the composite product is cut into short lengths, and the ductile metal separating the valve metal components of the composite is removed, preferably by leaching in mineral acids. The filaments are constrained within the valve metal tube, making handling during subsequent capacitor manufacture much less difficult than if the filaments were allowed to move freely.

36 Claims, 7 Drawing Sheets

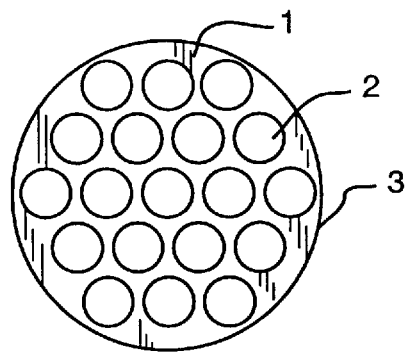
FIG. 1a
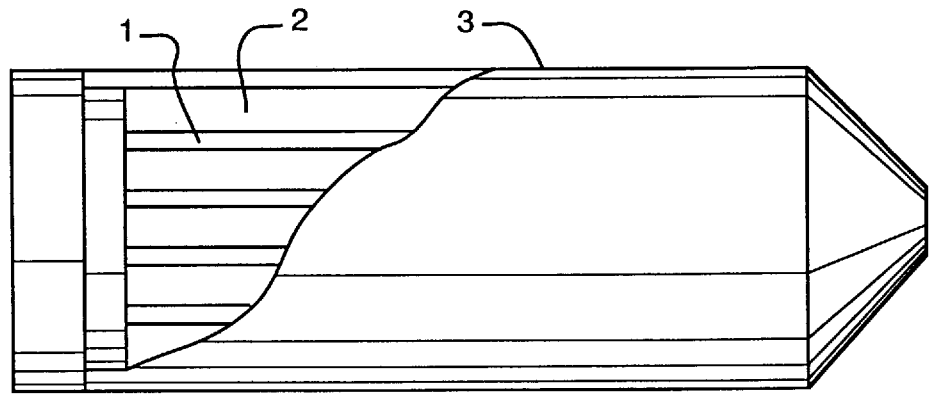
FIG. 1b
FIG. 1

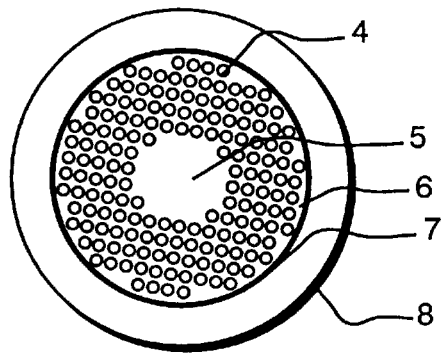
FIG. 3a
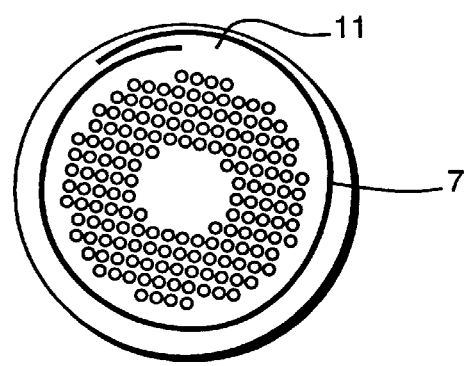
FIG. 3b
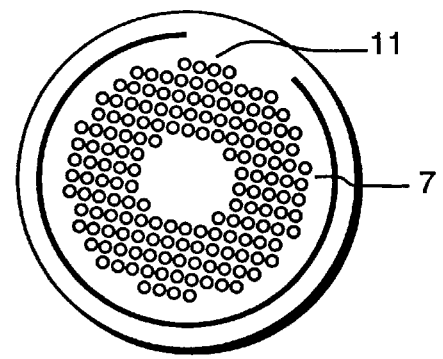
FIG. 3c
FIG. 3

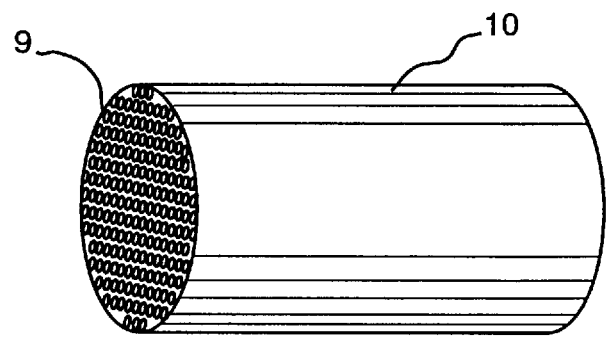
FIG. 4a
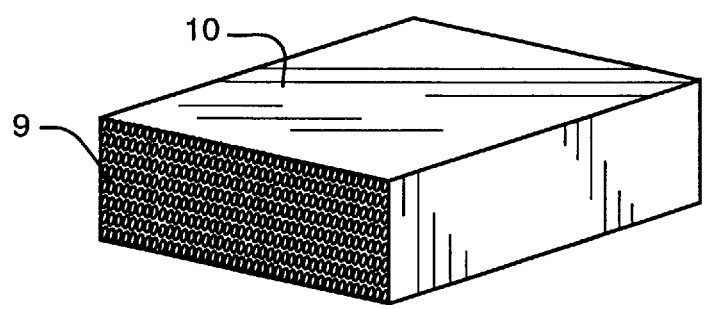
FIG. 4b
FIG. 4

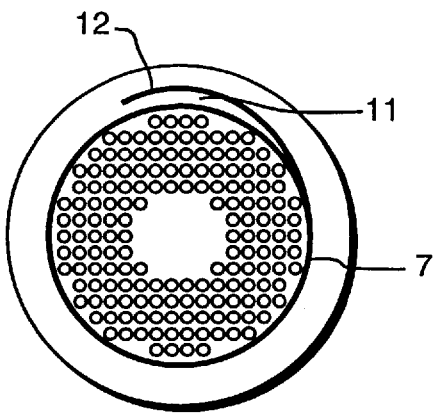
FIG. 5a
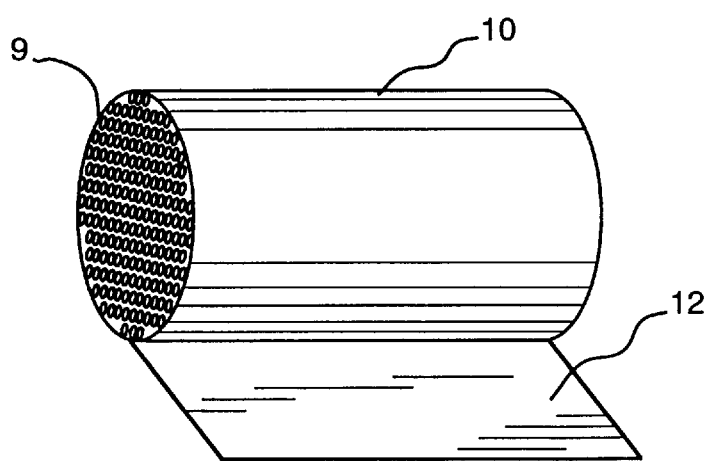
FIG. 5b
FIG. 5

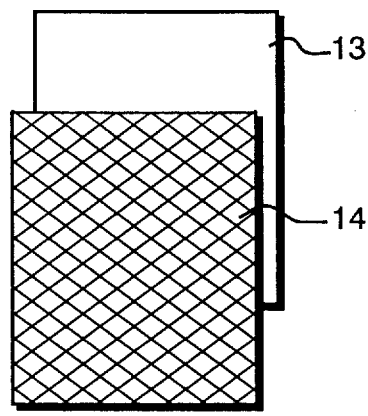
FIG. 6a
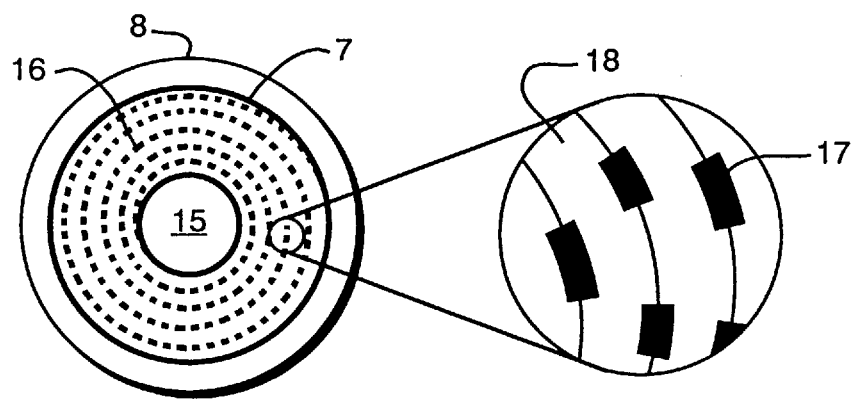
FIG. 6b  FIG. 6c
FIG. 6

CONSTRAINED FILAMENT ELECTROLYTIC ANODE AND PROCESS OF FABRICATION

RELATED APPLICATIONS

This application is a continuation in part of our applications Ser. No. 08/781,962 filed Dec. 20,1996 and Ser. No. 08/844,062 filed Apr. 18,1997.

TECHNICAL FIELD

The present invention pertains to porous metal compacts used in electrolytic processes. A primary application of such compacts is in the manufacture of electrodes—e.g., the anode of an electrolytic capacitor. The present invention also discloses methods for the fabrication of such porous metal capacitors.

BACKGROUND ART

Tantalum-based electrolytic capacitors have found increasing use in microelectronics. The combination of small package size, insensitivity to operating temperature, and excellent reliability have made them the choice over ceramic multilayer and aluminum foil-based capacitors for many applications. As the state of the art in microelectronics continues to progress, demand has grown for smaller, more cost-effective tantalum electrolytic capacitors. This demand entails improvements in the quality and performance of the tantalum compacts that are at the heart of such capacitors. The present invention builds upon an earlier invention (U.S. Pat. No. 5,034,857), with the aim of providing the capacitor industry with improved tantalum capacitors.

STANDARD INDUSTRY PRACTICE

In present day industry, an electrolytic tantalum capacitor is fabricated using fine particle tantalum powder. The powder is pressed into a green compact (20 to 50 percent dense) and is sintered under vacuum at a temperature of 1500°–2000° C. for 15–30 minutes to form a porous, mechanically robust body in which the tantalum is electrically continuous. The sintering process is, in some cases, relied upon to attach a lead wire to the compact. In these cases, the lead is inserted into the green compact prior to sintering. If the lead is not attached in this manner, it will usually be welded into place immediately following sintering of the compact. An important ancillary benefit of the sintering operation is purification of the tantalum particle surfaces; impurities, such as oxygen, are driven off.

After sintering, the compact is anodized to form the dielectric tantalum pentoxide ($Ta_2O_5$) on the exposed surfaces. The porous regions of the anodized compact are then infiltrated with a conductive electrolyte. Typically, manganese dioxide ($MnO_2$) or sulfuric acid is used as the electrolyte. In the case of $MnO_2$, a manganese nitrate solution is infiltrated and then thermally decomposed into $MnO_2$. The final capacitor manufacturing stages are assembly of a current collector and packaging of the capacitor.

POWDER MANUFACTURING

State of the art tantalum powder is produced by the sodium reduction process of $K_2TaF_7$. Improvements in the process have resulted in commercially available powders capable of yielding a specific capacitance of over 23,000 CV/g. Better control of input tantalum particle size, reaction temperature, and other variables has led to the improvements in specific capacitance. A key advance was the introduction of doping agents that enabled the production of very high specific capacitance powders. The doping agents serve to prevent surface loss during sintering. Typical additives are nitrogen, oxygen, sulfur, and phosphorus compounds in the range from 50 to 500 ppm. While select dopants are beneficial, it is important to limit other contamination, which can weaken the dielectric film or even prevent the formation of a continuous $Ta_2O_5$ layer that could lead to premature breakdown of the dielectric film and loss of capacitance.

Higher capacitance tantalum particles have been obtained by ball milling powders. Ball milling turns the roughly spherical powder particles into flakes. The benefit is that the flakes have a higher surface-area-to-volume ratio than do the powder particles. This translates into greater volumetric efficiency for the flakes when they are formed into anodes. Aspecting tantalum particles by ball milling and other processes aimed at improving powder performance, while effective, have practical drawbacks, including increased manufacturing costs and a marked decrease in product yield. Currently, a premium of 2–3 times is charged for the very highest capacitance powders over standard product.

The very fine tantalum powders commercially available today have several serious problems with respect to anode fabrication. The most important is a sensitivity to surface area loss during sintering. Ideal sintering conditions are high temperatures and short times. A higher temperature serves to purify the tantalum surface and provide a mechanically strong compact. Capacitors having lower equivalent series resistance (ESR) and equivalent series inductance (ESL) can be fabricated if higher sintering temperatures are employed. Unfortunately, the fine particles of high capacitance powders and flakes lose surface area at temperatures over 1500° C. A loss of surface area results in lower capacitance, reducing the benefit of using the higher specific capacitance powder. The capacitor manufacturer must balance sintering temperature, mechanical properties, and ESR and ESL levels in order to maximize capacitor performance.

Fine powders and flakes are also sensitive to forming voltage during anodization. The anodization process consumes some of the metallic tantalum to form the dielectric layer. As the forming voltage increases, more of the tantalum is consumed, resulting in a loss of capacitance. As the powder becomes finer, this problem becomes increasingly serious.

In practice today, high surface area powders are sintered at low temperatures (below 1500° C.) and are anodized at voltages below 50 volts. Most of these capacitors are restricted to operating voltages below 16 volts.

Another drawback to fine powders is "tortuousity", which can lead to poor electrolyte fill factor. As particle size is reduced, the pathways that the electrolyte must follow to infiltrate the compact grow increasingly narrow and more convoluted, or tortuous. Eventually, it becomes extremely difficult, if not impossible, to completely infiltrate the compact. Incomplete infiltration results in lower capacitance.

A final difficulty in using high specific capacitance tantalum powders is their poor flowability. In state of the art capacitor manufacturing processes, tantalum powder is metered into a die for pressing into the green compact. It is very important that the metering process is accurate and reliable in order that each capacitor contains the same quantity of powder. Flakes and highly aspected powders tend not to flow uniformly, which can lead to large variability in production runs.

FIBER PRODUCTION

U.S. Pat. No. 5,034,857, by Wong, discloses a novel approach to the production of very fine valve metal filaments, preferably tantalum, for capacitor use. The benefits of fine filaments relative to fine powders are higher purity, lower cost, uniformity of cross section, and ease of dielectric infiltration, while still maintaining high surface area for anodization. The uniformity of cross section results in capacitors with high specific capacitance, lower ESR and ESL, and less sensitivity to forming voltage and sintering temperature as compared to fine powder compacts.

As disclosed in Wong '857, valve metal filaments, preferably tantalum, are fabricated through the combination of the filaments with a ductile metal so as to form a billet. The second, ductile metal is different from the metal that forms the filaments. The filaments are substantially parallel, and are separated from each other and from the billet surface by the second, ductile metal. The billet is reduced by conventional means—e.g., extrusion and wire drawing—to the point where the filament diameter is in the range of 0.2 to 5.0 microns in diameter. At that point, the second, ductile metal is removed, preferably by leaching in mineral acids, leaving the valve metal filaments intact. The filaments are suitable for use in tantalum capacitor fabrication. The present invention extends the technology disclosed in Wong '857.

Other patents involving valve metal filaments and fibers, their fabrication, or articles made therefrom include U.S. Pat. Nos. 3,277,564, (Webber), 3,379,000 (Webber), 3,394,213, (Roberts), 3,567,407 (Yoblin), 3,698,863 (Roberts), 3,742,369 (Douglass), 4,502,884 (Fife), 5,217,526 (Fife), 5,306,462 (Fife), 5,284,531 (Fife), and 5,245,514 (Fife). In none of these cases is the central feature of the present invention disclosed, said feature being a thin valve metal sheath ($\leq 100$ microns thick) constraining a short tow of fine valve metal filaments (each filament <5 microns in diameter).

Fife '514 discloses an assembly of tantalum filaments connected to form a continuous network. While superficially similar to the present invention, it is important to note that the cells of the disclosed network do not contain tantalum filaments, as does the sheath of the present invention. In addition, the area within the cells is far smaller than is the area within the sheath of the present invention, which would be expected to make leaching of the composite much more difficult than in the present invention. Finally, Fife '514 simply does not disclose an article containing discrete valve metal filaments, but specifically describes a continuous structure of valve metal. That this structure is formed from valve metal filaments is incidental. The discrete valve metal filaments of the present invention possess substantially higher surface area than could be obtained if the filaments were connected together in the manner of Fife '514. This translates directly into improved capacitance.

Relevant to the present invention is the internal tin process used for the fabrication of $Nb_3Sn$ superconducting wire. In this process, a barrier, usually tantalum or a tantalum alloy, is employed to prevent tin contamination of the stabilizing copper on the exterior of the wire. The process is described in the article entitled "A15 Superconductors" in the *Metals Handbook,* Tenth Edition, Volume 2, *Properties and Selection: Non-Ferrous Alloys and Special Purpose Materials,* on pages 1060–1076, authored by David B. Smathers. While the valve metal sheath described in the present invention is similar to the barrier used in internal tin $Nb_3Sn$ conductor fabrication, application of the technology to porous metal compacts for electrolytic capacitors is entirely unique.

BRIEF SUMMARY OF THE INVENTION

The present invention is directed to the fabrication of fine valve metal filaments for use as porous metal compacts used in the manufacture of electrolytic capacitors. A very small body of constrained valve metal filaments and a method for manufacture are disclosed. The invention will be of greatest value in the microelectronics industry, which seeks to develop increasingly smaller capacitors. The valve metal is selected from among the metallic elements niobium, tantalum, zirconium, titanium, and hafnium, or alloys made therefrom. Tantalum, niobium, or alloys thereof are preferred. In a preferred form, the product of the present invention, the valve metal filaments are of a diameter less than 5 microns. They are constrained within a cylindrical sheath, also made of valve metal, which has a wall thickness of 100 microns or less. The valve metal that forms the sheath is preferably the same as that of the filaments, but is not necessarily so. Provided that sintering temperatures are not so high as to cause significant alloy formation between the filaments and the sheath, the sheath may be composed of an alternate valve metal selected from the aforementioned list of metallic elements or alloys made therefrom.

In a preferred form, the product of the present invention is fabricated in essentially the same manner as is disclosed in U.S. Pat. No. 5,034,857 (Wong), except that a layer of valve metal sheet, which ultimately becomes the constraining sheath, is provided within the final billet. The final billet thus consists of an assembly of valve metal filaments, preferably tantalum, separated by a ductile metal, preferably copper, surrounded by one or more layers of metal that form a continuous valve metal sheath, said layers being separated from the filament array and from the billet surface by the same ductile metal as is used to separate the filaments. The billet is reduced in size by conventional means, preferably by hot extrusion and wire drawing, to the point where the filaments are of a diameter less than 5 microns and the thickness of the sheath is 100 microns or less. This composite is then cut into lengths appropriate for capacitor fabrication. The secondary, ductile metal that served to separate the valve metal components is then removed from the sections, preferably by leaching in mineral acids. A number of small bodies of sheathed valve metal filaments result. These bodies are suitable for use in electrolytic capacitor fabrication.

BRIEF DESCRIPTION OF THE DRAWINGS

FIG. 1 is a schematic depiction of the primary billet used in the preferred embodiment of the present invention. FIG. 1a shows a transverse cross section. FIG. 1b is a cutaway view revealing the longitudinal disposition of the billet components.

FIG. 3 is a schematic depiction of the transverse cross section of the secondary billet used in the process of the present invention. FIG. 3a shows the billet in the preferred embodiment of the present invention, wherein the sheath is circumferentially continuous. FIG. 3b shows the billet in another embodiment, wherein the sheath contains a gap that renders it circumferentially discontinuous, but overlapping. FIG. 3c is similar to FIG. 3b in that the sheath is shown as being circumferentially discontinuous, but no overlap is present.

FIG. 4 is a schematic depiction of the product of the preferred embodiment of the present invention. FIG. 4a shows the product as a cylindrical body. FIG. 4b shows the product after shaping into a rectangular body.

FIG. 5 schematically illustrates another embodiment of the present invention. FIG. 5a shows the transverse cross section of the secondary billet used in this embodiment of the present invention. FIG. 5b shows the product of this embodiment as a cylindrical body with a thin, metallurgically bonded tab of tantalum.

FIG. 6 is a schematic depiction of the primary billet used in one embodiment of the present invention. FIG. 6a shows a copper sheet juxtaposed with a section of tantalum mesh. This combination is used to form the jelly-roll that is inserted into the primary billet. FIG. 6b shows the transverse cross section of the primary billet. FIG. 6b also illustrates tantalum filaments in a copper matrix, the result of sufficient reduction of the composite. FIG. 6c, which is an enlarged view of the primary billet.

DETAILED DESCRIPTION OF THE INVENTION

In the preferred embodiment of the present invention, the process begins with tantalum rods that are inserted into holes drilled longitudinally into a copper billet, shown schematically in FIGS. 1a and 1b. Referring to the Figures, the copper forms a matrix 1 which separates the tantalum rods 2. The assembly as a whole forms the primary billet 3. As FIG. 1b indicates, the rods run longitudinally through the body of the billet and are substantially parallel. After assembly, a copper nose and tail are welded onto the primary billet, and the billet is then evacuated and sealed. At this point the primary billet may optionally be hot or cold isostatically pressed (HIP'd or CIP'd) in order to collapse any void space, thereby promoting filament uniformity. If the billet is hot or cold isostatically pressed, it will usually be machined on a lathe afterwards in order to restore a cylindrical shape.

Figure 2:
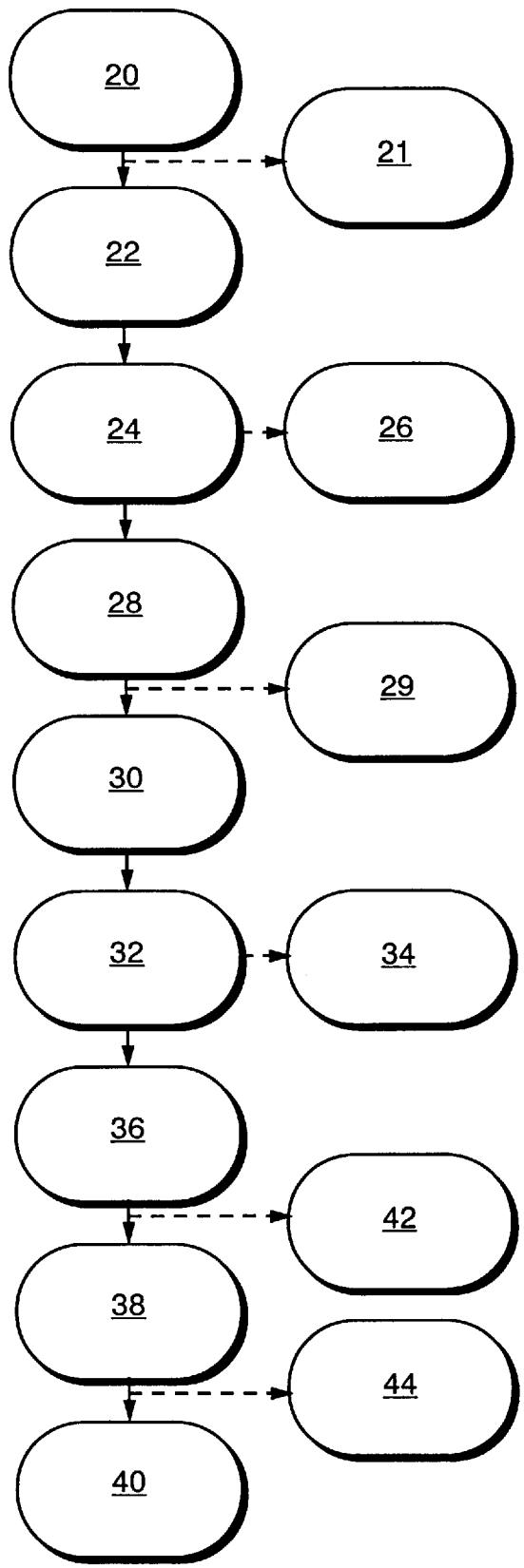
FIG. 2 is a flow-chart describing the steps followed in the execution of the process used in the preferred embodiment of the invention, along with steps that may be employed in other embodiments.

The primary billet, containing the tantalum rods in a copper matrix, is processed in accordance with the flow-chart of FIG. 2. The billet is extruded at elevated temperature at a diameter reduction ratio of approximately 6:1. The resulting rod is cropped, and the rod is drawn down to restack diameter. As indicated in FIG. 2, annealing may optionally be performed during drawing should the wire become too stiff or breakage occurs. Annealing temperatures for tantalum are well known in the art they are typically in the range of 900° C.

At restack diameter, the composite wire is cut into lengths for assembly into the secondary billet. The secondary billet transverse cross section is shown schematically in FIG. 3a. The subelements 4 made from the primary billet are stacked together with copper rods. The copper rods are used to form a copper core 5, and an outer annulus 6. Both the core and the outer annulus are provided in order to make leaching of the final composite less difficult. Outside the assembly of subelements and copper rods is a layer of tantalum sheet 7. The sheet is the same length as are the rods and it completely surrounds the filament array. The sheet thickness is comparable to the diameter of the tantalum filaments within the subelements. Outside the cylinder of tantalum sheet is an outer copper can 8.

The secondary billet is assembled, a nose and tail are welded into place, and the billet is evacuated and sealed. The sealed billet is optionally prepared for extrusion by hot or cold isostatic pressing in order to collapse any void space within the billet and to promote filament uniformity. After isostatic pressing, the secondary billet is machined to fit the extrusion liner. The billet is then extruded at elevated temperature at a diameter reduction ratio of 6:1.

The extruded rod is cropped, and the rod is then drawn to a diameter where the tantalum filament diameter is 5 microns or less. Again, as indicated in FIG. 2, annealing steps may be employed if necessary. At final size, the composite wire is cut into short lengths as required, preferably not less than 1.5 times the final wire diameter. The cutting process must be as "clean" as possible, by which is meant that smearing or pinching at the ends of the cut sections must be kept to a minimum. If the cutting does not provide sufficiently clean ends, this will interfere with the subsequent leaching process. Clean cut ends may be achieved through the use of a high-precision impact cutoff machine.

The cut sections are immersed in a solution of nitric acid and water. A suitable solution would be one part nitric acid to one part water, but other concentrations of nitric acid can be employed if required. The sections are immersed for a period of time sufficient for the acid to fully leach out the tantalum filaments and the tantalum sheath. The total time will depend primarily upon the composite wire diameter and length, with smaller diameters and greater lengths requiring longer times. This is due to the fact that the acid can only penetrate through the ends of the cut sections. Narrow openings and long distances do not lend themselves to rapid etching.

In regard to the leaching process, it is an essential feature of this embodiment of the present invention that the secondary billet is provided with a copper core 5 and a copper annulus 6 (FIG. 3a). During the leaching process, the copper core and annulus etch away much more rapidly than does the copper separating the filaments, since the filaments are comparatively tightly spaced. As a result, the acid eventually surrounds the annulus of tantalum filaments, and can then attack the filament matrix from all directions, rather than just from the ends of the cut sections. The design of the secondary billet thus greatly improves the efficiency of the leaching process.

After leaching, one is left with the product of the present invention, shown schematically in FIG. 4a. It consists of fine tantalum filaments (<5 micron diameter) 9, surrounded by a thin tantalum tube 10. This product can be made into an anode for an electrolytic capacitor by conventional means, including sintering, anodizing, infiltrating with electrolyte, etc. It may be desirable to shape the product of the present invention by means such as pressing in a die. A rectangular chip can be produced in this manner. Such a chip is illustrated in FIG. 4b. A rectangular chip may be more compatible with current industry standards. The shaping is preferably performed prior to sintering of the product. The shaping may be done either with or without the ductile metal matrix present (see FIG. 2). In addition to shaping, it may be desirable to further compact the product of the present invention. In such cases, the product is compressed, rather than simply reshaped. Further compaction may be beneficial to electrical continuity within the compact.

Depending upon the degree of electrical continuity and the level of tantalum purity within the product of the present invention, it may not be necessary to sinter the product. If sintering is avoided, the process of the present invention will be less expensive. The decision on whether or not to sinter the product will depend primarily upon the requirements of the application.

Another embodiment of the invention employs the secondary billet illustrated schematically in FIG. 3b. The billet is identical to that shown in FIG. 3a except that the layer of tantalum sheet 7 is not circumferentially continuous, but contains a gap 11. The gap is positioned at an overlap in the tantalum sheet, so that the filaments are completely surrounded by the tantalum layer, much as in the preferred embodiment. A section of copper sheet is inserted into the gap so as to prevent tantalum-to-tantalum contact in the region of the overlap. Processing of the secondary billet proceeds exactly as described above, including leaching in nitric acid. The gap in the tantalum sheath accelerates the leaching process, since the acid can now penetrate from the exterior of the cut sections, as well as from the ends.

Yet another embodiment of the invention employs the secondary billet illustrated schematically in FIG. 3c. This embodiment is similar to that illustrated in FIG. 3b, and described above, except that the tantalum sheet 7 does not overlap. The sheet does not fully surround the filaments, leaving the gap 11. Although the sheet does not fully surround the filaments, it does to a substantial extent, so that the filaments are for the most part constrained. Processing of the secondary billet proceeds as described above. Again, the gap in the tantalum sheath serves to accelerate the leaching process.

Yet another embodiment of the present invention employs the secondary billet illustrated schematically in FIG. 5a. The secondary billet is similar to that illustrated in FIG. 3b, except that the tantalum sheet is circumferentially continuous. Referring to FIG. 5, the tantalum sheet 7 fully encloses the array of tantalum filaments in their copper matrix, and then continues for some distance to create the overlap 12. The overlap is separated from the bulk of the sheath by a section of copper sheet that is inserted into the gap 11. The secondary billet is processed as in the preferred embodiment of the invention. After the final leaching step, one is left with a number of small bodies like that illustrated schematically in FIG. 5b. The tantalum filaments 9 are constrained within the tantalum sheath 10. The overlapping tantalum sheet 12 of the secondary billet forms a thin tantalum tab that is metallurgically bonded to the sheath as a result of secondary billet processing. A lead wire may be attached to the tantalum tab or the tab itself may be used as a lead wire during anodization and impregnation of the capacitor. The tab may also serve as an electrical contact in final capacitor packaging.

In other embodiments of the invention, all or part of the tantalum sheath is made to be perforated or porous so as to accelerate the leaching process while still maintaining the effectiveness of the sheath with regard to constraint of the enclosed tantalum filaments.

Still another embodiment of the invention employs the primary billet illustrated schematically in FIG. 6. Copper sheet 13 and tantalum mesh 14 are wrapped in jelly-roll fashion around a copper core 15, forming alternating layers 16. The copper sheet is disposed so as to face outward relative to the copper core of the jelly-roll. The assembly of copper sheet, tantalum mesh, and copper core is inserted into a copper can 8 lined with tantalum sheet 7. A copper nose and tail are welded onto the billet, and the billet is evacuated and sealed. At this point, the primary billet may optionally be hot or cold isostatically pressed (HIP'd or CIP'd) in order to collapse any void space, thereby promoting filament uniformity. If the billet is hot or cold isostatically pressed, it will usually be machined on a lathe afterwards in order to restore a cylindrical shape.

The primary billet is processed in accordance with the flow-chart of FIG. 2. If the starting copper sheet and tantalum mesh thicknesses are sufficiently small, it may not be necessary to restack the primary billet; sufficient reduction may be obtained in the initial extrusion and drawing steps. This is the main advantage of this embodiment of the invention. After adequate reduction, the tantalum mesh will elongate, forming filaments 17 within the copper matrix 18 (FIG. 6b). The final wire is cut into segments and the copper is leached out, as in the preferred embodiment of the invention. The tantalum sheath constrains the tantalum filaments.

Should the thickness of the copper sheet and tantalum mesh within the primary billet require the assembly of a secondary, restack billet, the design of the primary billet is modified. The tantalum sheet 7 is eliminated. The primary billet is then processed to restack diameter. As in the preferred embodiment, it is cut into lengths for restack into the secondary billet. The tantalum sheet 7 is added at this stage, surrounding the stack of subelements produced from the primary billet and (optionally) copper rods. Processing then proceeds as described in the preferred embodiment.

The use of meshes to form filamentary structures is disclosed in U.S. Pat. Nos. 4,262,412 (McDonald), 4,414,428 (McDonald), and 4,973,527 (Smathers). In this prior art, the mesh is intended to provide strength, to prevent diffusion, or to form superconducting filaments. When mesh is employed to form superconducting filaments, the superconducting material is usually of the A15 variety. The use of mesh to form A15-type superconductors is described in detail in the article entitled "A15 Superconductors" in the *Metals Handbook*. Tenth Edition, Volume 2, *Properties and Selection: Non-Ferrous Alloys and Special Purpose Materials*, on pages 1060–1076, authored by David B. Smathers. In none of the prior art is the use of mesh disclosed as a means to fabricate the product of the present invention.

Figures 7, 7A, 7B:
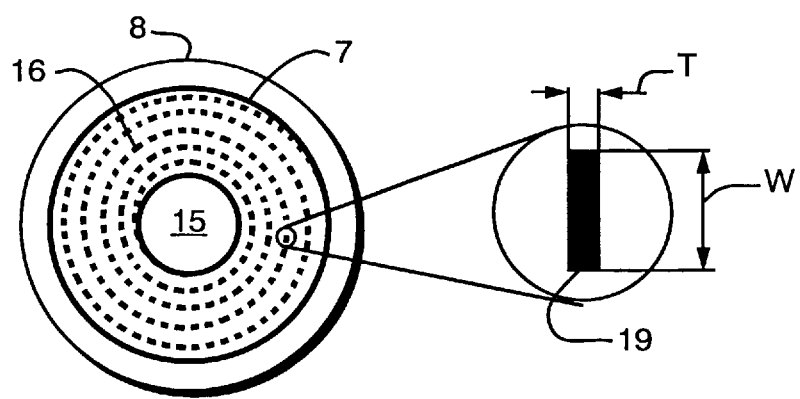
FIG. 7a is a schematic depiction of the primary billet used in an embodiment of the invention which is the same as that shown in FIG. 6 except that each mesh element, which forms a filament after sufficient reduction of the composite, has a width (w) to thickness (t) ratio of at least 2:1.
FIG. 7b, an enlarged view of a mesh element 19 of the primary billet.

Another embodiment of the present invention is schematically illustrated in FIG. 7. A jelly-roll structure of copper sheet and tantalum mesh is assembled and processed exactly as described above, with the exception that the mesh is made so as to produce filaments having an aspected transverse cross-sectional shape. Referring to FIG. 7, each mesh element 19 has a thickness, t, and a width, w. The cross-sectional aspect ratio, A, of each element is defined as the ratio of width to thickness, w/t. Hence, A=w/t. In this embodiment of the invention, the aspect ratio A is always greater than or equal to 2 (A≧2). After sufficient reduction, the mesh elements form filaments, said filaments having the same cross-sectional aspect as the original mesh. Aspected filaments may be desirable for reasons of improved capacitor performance. The improvement results from greater volumetric efficiency, in direct analogy with aspected powders.

As will be obvious to anyone knowledgeable in the art, the copper sheet and the tantalum mesh may be combined in configurations other than a jelly-roll. For example, sections of copper sheet and tantalum mesh may be placed alternately one atop the other to form a stack. Such a configuration may be desirable for various reasons, such as the absence of a copper core. Alternate configurations such as stacked sheets fall within the purview of the present invention.

As noted previously, the valve metal filaments of the invention are preferably composed of tantalum, niobium, or alloys thereof. Other embodiments may employ composite filaments of the type described in Wong '857. In this case, each composite filament consists of a tantalum coating on a core composed of a transition metal or a transition metal alloy. Examples of filament core materials include niobium, niobium-titanium, niobium-tantalum, and niobium-zirconium. The benefits of a composite filament may include reduced density and improved ductility as compared to pure tantalum filaments. Reduced density translates into higher specific capacitance, while improved ductility simplifies processing.

The prior art discloses methods for forming valve metal filaments from valve metal powders mixed with powders of a second, ductile metal. This prior art includes U.S. Pat. Nos. 3,742,369 (Douglass) and 4,502,884 (Fife). As will be obvious to anyone knowledgeable in the art, such a composite of powders could be surrounded by a valve metal sheet in the manner of the present invention. With sufficient reduction, the valve metal powders would elongate into filaments. The valve metal sheath would constrain these filaments in the final product, just as in the present invention.

Chopped wire is another method by which a ductile metal and a valve metal may be combined to form the filaments of the present invention. By "chopped wire" is meant, for example, a chopped composite wire containing both copper and tantalum. Chopped wire may be regarded as a form of coarse powder. Again, it would be obvious to anyone knowledgeable in the art to surround such an assemblage of copper and tantalum with a tantalum sheet in the manner of the present invention.

While powder and chopped wire processes lie within the purview of the present invention, they are by no means to be preferred. The inherent randomness of powders and chopped wires will result in filament non-uniformity and difficulties in leaching of the final composite. Powder processes will also tend to result in unacceptable variability in the tantalum content of the final product.

When the valve metal filaments of the invention are freed from their ductile matrix, they are subject to oxygen pick-up. Tantalum, in particular, has a strong affinity for oxygen, and can easily be contaminated during the leaching process, especially if the leaching operation is performed at an elevated temperature. When oxygen contamination occurs, it is desirable to deoxidize the filaments by methods such as placing the filament compact in an inert atmosphere in the presence of a metal which, when heated to a sufficiently high temperature, has a greater affinity for oxygen than does the valve metal forming the filaments. Magnesium and calcium are examples of suitable deoxidizing metals. Deoxidation is a common operation employed for the purification of tantalum powders used in capacitors. The process is well known in the art. The prior art includes U.S. Pat. Nos. 3,697,255 (Baldwin et al), 4,483,819 (Albrecht et al), 4,537,641 (Albrecht et al), 4,722,756 (Hard), and 5,242,481 (Kumar).

That deoxidation techniques developed for valve metal powders may be of benefit to the product of the present invention is not surprising, since the fine filaments of the product are, for all intents and purposes, only a special type of powder. In both cases—fine powder and fine filaments—one has a collection of valve metal entities having a high surface-to-volume ratio. Any technique employed to improve the properties of fine valve metal powders should therefore also improve the properties of the fine filaments in the product of the present invention.

In addition to deoxidation, other techniques developed for improving the properties of valve metal powders and powder compacts that may be applied to the product of the present invention include: agglomeration, doping, and the use of additives such as metal oxides or chalcogens. All of these techniques are well known in the art. Heat treatment for the purpose of agglomeration is disclosed in U.S. Pat. No. 3,418,106 (Pierret). Doping valve metal Powders with chemicals such as nitrogen, oxygen, phosphorus, boron, sulfur, and silicon, said chemicals being applied either singly or in combination, is disclosed in U.S. Pat. Nos. 3,825,802 (Kumagai et al), 4,009,007 (Fry), 4,544,403 (Schiele), 5,448,447 (Chang), 4,582,530 (Heinrich et al), 4,645,533 (Izumi), and 4,957,541 (Tripp et al). The addition of metal oxides is disclosed in U.S. Pat. Nos. 4,569,693 (Albrecht et al) and 4,041,359 (Mizushima et al). The use of chalcogens to improve surface properties is disclosed in U.S. Pat. No. 4,548,672 (Albrecht et al).

Depending upon anode performance requirements, the techniques cited here may be applied individually or in combination. If in combination, they may be applied either sequentially or simultaneously. Chang '447, for example, teaches agglomeration followed by doping with both nitrogen and oxygen.

The above-cited techniques are not intended to be limiting. Similarly, the cited prior art is not intended to be comprehensive.

ADVANTAGES OF THE INVENTION

The primary advantages to the process of the present invention can be summarized as follows:

1) The process eliminates the need for pressing powders to form compacts. Metering powder into a pressing die can be difficult to do on a reliable basis, especially for fine powders, and pressing operations can be complicated and expensive. The process of the present invention completely bypasses these steps.

2) The filaments are free of any external contamination. The matrix containing the filaments during processing prevents exposure to contaminants (e.g., oxygen) that can be detrimental to the formation of tantalum pentoxide during anodization. This feature of the invention is particularly important in view of the high surface-to-volume ratios of the very fine filaments (e.g., less than 1 micron) that can be produced by the present invention.

3) The process ensures cross-sectionally uniform filaments having a high surface-to-volume ratio. Both factors are important for the reliable fabrication of high capacitance capacitors on an industrial scale.

4) The process is reliable and repeatable. Due to the nature of the process, every section of the final wire is identical to every other section with respect to cross section. Hence, there need not be any concern about a cut section from one part of the wire differing significantly from that from another part. Furthermore, the process is so straightforward that a cut section produced from one billet will not differ significantly from that produced from another billet.

5) The process is flexible. By modifying the primary and/or secondary billet design, one can have as much or as little tantalum as desired in whatever volume density within the sheath one desires.

6) The process is economical. In processing the final billet in the preferred embodiment of the invention, the valve metal sheath and the filaments are simultaneously reduced to their final dimensions. Processes in which the filaments and sheath are fabricated and combined in isolated steps would be far less efficient and, therefore, much more expensive.

The primary advantages to the product of the present invention can be summarized as follows:

1) As mentioned in relation to process, the filaments are cross-sectionally uniform and possess a high surface-to-volume ratio. By cross-sectional uniformity is meant both uniformity along the filament length and uniformity from filament to filament.

2) The product is far easier to handle than the products of related inventions, such as Wong '857. In most cases, the fine tantalum filaments must be handled like powders—carefully mixed and doled out. The tantalum sheath employed in the present invention constrains the filaments, so that the product may be handled as a unit, not as a collection of fine filaments.

3) Because each section is a self-contained bundle of filaments, it is not necessary to weigh out a specific quantity of tantalum, as it is with powders. As capacitors grow increasingly smaller for microelectronics applications, the quantities of tantalum powder that must be metered out for each capacitor are falling into the milligram range. Such small quantities are very difficult to meter out on a reliable basis. The product of the present invention can have any quantity of tantalum required through proper design of the primary and secondary billets. Furthermore, the chosen quantity of tantalum will be the same in every section of wire, so that even when vanishingly small quantities of tantalum are required, this can be done on a highly reliable basis.

Methods for practicing the present invention are described in the following non-limiting examples:

EXAMPLE I 19 holes are drilled into a 15.3 cm diameter bar of copper 63.5 cm long. The holes are 2.57 cm in diameter and run the length of the bar in parallel fashion. The pattern of holes is as shown in FIG. 1a. The shortest distance between any two holes is 5.08 mm. A 1.27 cm inset is machined into each end of the copper bar. The insets are necessary in order that a copper nose and tail may be attached later. The copper bar containing the holes, a copper nose, and a copper tail are etched clean in a nitric acid solution, they are rinsed in water, rinsed a second time in methanol, and are then dried. 19 tantalum bars, 2.54 cm in diameter and 61 cm long, are wiped clean with acetone and are inserted into the holes in the copper bar. The nose and tail are tungsten inert gas (TIG) welded into place, and the billet is evacuated at a temperature of 427° C. to a pressure of $10^{-6}$ torr. The billet is then sealed.

In preparation for extrusion, the billet is heated at a temperature of 816° C. for a period of three hours. The billet is then extruded to a diameter of 2.54 cm. The extruded rod is cropped to ensure uniformity, and the cropped rod is cold drawn at an areal reduction rate of 20% per die pass to a final hexagonal diameter of 3.48 mm. That is, the final wire shape is hexagonal and the distance from flat to flat across the hexagon is 3.48 mm. At this size, the tantalum filament diameter is 0.61 mm.

The wire is straightened and cut to 61 cm lengths. Pure copper rod is drawn to 3.48 mm diameter hexagonal wire and is straightened and cut to 61 cm lengths in the same manner as is the wire containing the tantalum filaments. Both types of filaments are cleaned in nitric acid in the same manner as was the primary billet. 91 copper filaments are stacked together to form a symmetrical core. Around this core, 954 of the tantalum-containing filaments are stacked in symmetrical fashion. Finally, 402 copper filaments are stacked in symmetrical fashion outside of the stack of tantalum-containing filaments.

A section of 0.64 mm thick tantalum sheet, 45.7 cm wide and 61 cm long, is wiped clean with acetone and is inserted circumferentially into a clean copper can having an internal diameter 14.5 cm, an external diameter of 16.5 cm, and a length of 63.5 cm. The sheet overlaps by 0.3 cm so as to ensure a continuous layer. The long dimension of the sheet runs along the can length. The stack of filaments is inserted into the tantalum-lined can and the copper nose and tail are electron beam welded into place under a vacuum of $10^{-4}$ torr. The billet is then hot isostatically pressed at a pressure of 104 MPa and temperature of 650° C. for four hours. The isostatically pressed billet is machined to a diameter of 15.3 cm, and the billet is prepared for extrusion by heating for three hours at 816° C. The billet is then extruded to a diameter of 2.54 cm.

The extruded rod is cropped to ensure uniformity. It is then drawn at an areal reduction rate of 20% per die pass to a diameter of 0.51 mm. At this wire diameter, the diameter of the tantalum filaments is 2.03 microns, and the thickness of the tantalum sheath is 2.13 microns. The wire is cut into 0.77 mm lengths. The lengths are immersed in a solution of one part nitric acid to one part water. After the copper has leached away, the segments are thoroughly rinsed in water, followed by methanol, and are then dried. The tantalum filaments contained within the segments occupy 34.9 percent of the volume within the tantalum sheath. The segments are now suitable for further processing into a capacitor in accordance with the demands of the application.

EXAMPLE II

The present invention is executed as described in Example I, except for a modification in the assembly of the secondary billet. The internal diameter of the copper can is 14.7 cm, instead of 14.5 cm. The tantalum sheet width is 51.2 cm, instead of 45.7 cm. The sheet is placed circumferentially in the can along its 51.2 cm dimension. The sheet overlaps by 5.2 cm. A 5.4 cm wide strip of 0.64 mm thick clean copper sheet is inserted at the overlap so as to prevent tantalum-to-tantalum contact in this region. A copper-filled space results, as illustrated schematically in FIG. 3b. The copper sheet runs the full length of the tantalum sheet, so that tantalum-to-tantalum contact in the overlap region is prevented throughout the active billet length. Subsequent billet assembly and processing proceed as in Example I.

EXAMPLE III

The present invention is executed as described in Example I, except that the tantalum sheet inserted into the secondary billet has a width of 40.2 cm instead of 45.7 cm. When it is placed in the secondary billet, a 5.2 cm circumferential gap remains, as illustrated schematically in FIG. 3c. Billet assembly and processing then proceeds as in Example I. The circumferential gap in the tantalum sheath fills with copper in the course of billet processing.

EXAMPLE IV

The present invention is executed as described in Example I, except for a modification in the assembly of the secondary billet. The internal diameter of the copper can is 14.7 cm, instead of 14.5 cm. The tantalum sheet width is 61.2 cm, instead of 45.7 cm. The sheet is placed circumferentially in the can along its 61.2 cm dimension. The sheet overlaps by 15.2 cm. A 15.4 cm wide strip of 0.64 mm thick clean copper sheet is inserted at the overlap so as to prevent tantalum-to-tantalum contact in this region. A copper-filled space results, as illustrated schematically in FIG. 5a. The copper sheet runs the fill length of the tantalum sheet, so that tantalum-to-tantalum contact in the overlap region is prevented throughout the active billet length. Subsequent billet assembly and processing proceed as in Example I.

It may, in some cases, be economically attractive to utilize tantalum powders instead of tantalum rods in the practice of the present invention. Tantalum rods are fabricated from tantalum powders through a series of manufacturing steps well known in the art. The direct use of tantalum powders in the practice of the present invention eliminates these manufacturing steps and thus reduces cost. The use of tantalum powders in the practice of the present invention is described in the following non-limiting example:

EXAMPLE V 160 g of capacitor grade tantalum powder having an average particle size of 5–10 microns is poured into a 2.54 cm diameter cylindrical compaction die. The powder is compacted by means of steel pistons that slide inside the die, one piston entering from the top of the die, and one from the bottom. The powder is axially compressed by the pistons to a pressure of 345 MPa (50 ksi), and the resulting slug of compacted powder is removed from the die. The slug is 2.54 cm in diameter and is approximately 2.54 cm in height. It has an overall density of greater than 50% that of solid tantalum (i.e., greater than 8.33 g/cc).

Several hundred slugs of compacted tantalum powder are produced by the above process. The slugs are placed in a high vacuum sintering furnace, the vacuum is pumped, and the temperature is raised to at least 2000° C. The slugs are held at temperature for not less than 4 hours. This process serves to purify the tantalum particles in the compacts, which is important for later fabrication steps, and, ultimately, ensures optimum capacitor performance. The heating step also sinters the tantalum particles in the compacts together, making them more mechanically robust and thus easier to handle.

The sintered, cylindrical compacts are stacked one atop the other in the 2.57 cm diameter holes in the copper bar of Example I such that all 19 holes are filled. Each hole contains 24 individual compacts. Billet processing then proceeds as described in Example I.

As will be appreciated, the confining layer of the present invention can be quite porous so long as the layer still serves to hold the fibers together as a bundle after the ductile metal (e.g., copper) has been removed. This porosity can be an advantage where the length of the bundle of fibers is greater than the diameter, thus requiring a longer diffusion path for the leaching acid. The porosity of the confining layer can be provided in numerous ways. For example, if the confining layer is a sheet, it can have weakened portions which, when the sheet is reduced in cross section, will provide holes through the sheet while still retaining the structural integrity of the sheet so that the sheet can perform its confining function.

EXAMPLE VI

The present invention is executed as described in Example I, except that, prior to the final cutting and leaching steps, the composite wire is perforated by mechanical means. The perforations penetrate the outer copper surface and the underlying tantalum sheath. The perforated wire is then cut and the copper is leached out of the resulting segments as described in Example I. The perforations accelerate the leaching process by allowing the nitric acid solution to more readily penetrate the wire segments. The perforated sheath, still being substantially continuous, remains effective in constraining the tantalum filaments.

EXAMPLE VII

The present invention is executed as described in Example VI, except that the copper surface of the wire is removed prior to perforating. The copper surface is removed by immersing the wire in a solution of one part nitric acid to one part water. The exposed tantalum sheath is then perforated by mechanical means. Subsequent wire processing is as described in Example VI.

EXAMPLE VIII

The present invention is executed as described in Example III, except that a section of tantalum foil 0.16 mm thick and 5.30 cm wide is inserted so as to span the circumferential gap. The foil extends the full active length of the billet. In this configuration, the region of tantalum filaments in their copper matrix is completely surrounded by the tantalum sheath, but the sheath is comparatively thin locally; specifically, by a factor of one quarter compared to the greatest part of the sheath. After foil insertion, billet assembly and processing proceed as described in Example I. During the final drawing step, the thin region of the tantalum sheath develops holes—i.e., this region becomes porous. This local porosity accelerates leaching of the final composite segments by allowing the acid to more readily penetrate them. Despite the local porosity, the sheath is substantially continuous, and so is effective in constraining the tantalum filaments.

Tantalum mesh may be used in the practice of the present invention, as described in the following, non-limiting example:

EXAMPLE IX

Copper sheet and tantalum mesh are wound around a copper core to form a jelly-roll structure. The copper sheet is 0.25 mm thick, 61 cm wide, and 18.9 m long. The tantalum mesh is 0.51 mm thick, 61 cm wide, and 18.5 m long. The mesh is formed by expansion of 0.51 mm thick tantalum foil, by methods well known in the art. The mesh has approximately 70% open area. The copper core is 3.21 cm in diameter and 61 cm long. The copper sheet and the tantalum mesh are cleaned in acetone. The copper core is etched clean in a nitric acid solution, followed by rinsing in water, immersion in methanol, and drying in air. The mesh and the copper sheet are laid one atop the other as schematically illustrated in FIG. 6a. They are then wound around the copper core, with the tantalum mesh innermost. Approximately seventy copper/tantalum mesh layers are built up in this fashion. The final turn of the jelly-roll is copper sheet alone.

A copper can, nose, and tail are cleaned in the same manner as was the copper core. The copper can has an internal diameter of 14.5 cm, an external diameter of 18.4 cm, and is 63.5 cm long. A section of 0.64 mm thick tantalum sheet, 45.7 cm wide and 61 cm long, is wiped clean with acetone and is inserted circumferentially into the copper can. The long dimension of the sheet runs along the can length. The copper/tantalum mesh jelly-roll assembly is inserted into the tantalum-lined can. FIG. 6b shows the resulting billet cross section.

The copper nose and tail of the billet are electron beam welded into place under a vacuum of $10^{-4}$ torr. Prior to final sealing, the billet is diffuse beam heated to a temperature of 400° C. in order to drive off as much oxygen as possible from the surface of the copper sheet used in the jelly-roll. After welding, the billet is hot isostatically pressed at a pressure of 104 MPa and a temperature of 650° C. for four hours. The billet is then machined to a diameter of 15.3 cm in preparation for extrusion. Prior to extrusion, the billet is heated for three hours at 816° C. It is then extruded to a diameter of 2.54 cm.

The extruded rod is cropped to ensure uniformity. It is then drawn at an areal reduction rate of 20% per die pass to a diameter of 0.61 mm. At this diameter, the radial thickness of the tantalum filaments formed from the tantalum mesh is 2.03 microns, and the thickness of the tantalum sheath is 2.55 microns. The volume fraction of the tantalum filaments inside the sheath is 34.3%. Subsequent processing of this composite wire is as described in Example I for the secondary composite.

The present invention may be practiced as described in Example IX, except that the tantalum mesh is made such that the transverse cross section of each mesh element has an aspect ratio, A, of at least 2. By "transverse cross section" is meant that cross section that is generated when the mesh is cut along a plane that is perpendicular to the broad surface of the mesh. By "each mesh element" is meant the individual strands or ribbons of tantalum that collectively form the mesh. Referring to FIG. 7, the transverse cross section of each mesh element has a thickness, t, and a width, w. The cross sectional aspect ratio A=w/t is greater than or equal to 2. After forming the tantalum mesh into filaments, one is left with filaments having the same cross-sectional aspect ratio as the mesh elements, i.e., A≧2.

It will be obvious to anyone knowledgeable in the art, that one could use strips of tantalum rather than a mesh to form aspected filaments. The strips would run in substantially parallel fashion along the billet axis. They would be equally spaced and would be alternated with the copper sheet in the same manner as the mesh. Such an arrangement falls within the purview of the present invention, but is not to be preferred due to the difficulty of assembling a billet of this kind.

The following, non-limiting example describes the use of aspected tantalum mesh in the practice of the invention:

EXAMPLE X

Copper sheet and tantalum mesh are wound around a copper core to form a jelly-roll structure. The copper sheet is 0.84 mm thick, 61 cm wide, and 6.30 m long. The tantalum mesh is 1.67 mm thick, 61 cm wide, and 5.94 m long. The cross-sectional width of each mesh element is nominally 3.34 mm. The mesh thus has an aspect ratio of not less than two. It is formed by expansion of 1.67 mm thick tantalum foil, by methods well known in the art. The mesh has approximately 33% open area. The copper core is 2.54 cm in diameter and 61 cm long. The copper sheet and the tantalum mesh are cleaned in acetone. The copper core is etched clean in a nitric acid solution, followed by rinsing in water, immersion in methanol, and drying in air. The mesh and the copper sheet are laid one atop the other as schematically illustrated in FIG. 6a. They are then wound around the copper core, with the tantalum mesh innermost. Approximately twenty-three copper/tantalum mesh layers are built up in this fashion.

A copper can, nose, and tail are cleaned in the same manner as was the copper core. The copper can has an internal diameter of 14.5 cm, an external diameter of 17.3 cm, and is 63.5 cm long. The copper/tantalum mesh jelly-roll assembly is inserted into the can. FIG. 7 shows the resulting billet cross section.

The copper nose and tail of the billet are electron beam welded into place under a vacuum of $10^{-4}$ torr. Prior to final sealing, the billet is diffuse beam heated to a temperature of 400° C. in order to drive off as much oxygen as possible from the surface of the copper sheet used in the jelly-roll. After welding, the billet is hot isostatically pressed at a pressure of 104 MPa and a temperature of 650° C. for four hours. The billet is then machined to a diameter of 15.3 cm in preparation for extrusion. Prior to extrusion, the billet is heated for three hours at 816° C. It is then extruded to a diameter of 2.54 cm.

The extruded rod is cropped to ensure uniformity. It is then drawn at an areal reduction rate of 20% per die pass to an hexagonal diameter of 2.63 mm. This wire is straightened and cut into 52 cm lengths. Pure copper is drawn to the same hexagonal diameter and is also straightened and cut into 52 cm lengths. The copper rods and the tantalum-containing rods are etched clean in a nitric acid solution, followed by rinsing in water, rinsing in methanol, and drying. A total of 223 of the copper rods are assembled to form a cylindrical core. A total of 2406 of the tantalum-containing rods are stacked in symmetrical fashion around the copper core.

A section of tantalum sheet 0.32 mm thick, 46.2 cm wide, and 52 cm long is wiped clean with acetone. It is inserted circumferentially into a clean copper can having an internal diameter of 14.7 cm, an external diameter of 15.9 cm, and a length of 54.5 cm. The long dimension of the tantalum sheet runs along the can length. The stack of copper and tantalum-containing rods is then inserted into the tantalum-lined can. A copper nose and tail are electron beam welded into place under a vacuum of $10^{-4}$ torr. The billet is heated to 400° C. prior to final sealing. The sealed billet is then HIP'd, machined, heated, and extruded in exactly the same manner as was the primary billet.

The extruded rod is cropped and is then drawn at an areal reduction rate of 20% per die pass to a final diameter of 2.54 mm. At this diameter, the thickness of the tantalum sub-elements is 0.50 micron and the thickness of the tantalum sheath is 5.31 microns. The volume fraction of tantalum elements within the sheath is 32.4%. Subsequent processing of this composite wire is as described in Example I for the secondary composite, except that the segment length is 3.81 mm.

The present invention may be practiced with powders or chopped wire as described in the following, non-limiting examples:

EXAMPLE XI

De-oxidized, capacitor grade tantalum powder is sifted to −270+325 (45 μm particle size). Clean OFHC C101 copper powder is sifted to −230+270 (53 μm–63 μm particle size). A total of 1.74 kg of the sifted tantalum powder and 1.87 kg of the sifted copper powder are thoroughly mixed in a ball mill under a protective argon atmosphere. A copper can is prepared by boring a 66.0 mm diameter hole into an 82.6 mm diameter copper bar. The hole depth is nominally 165 mm, while the length of the bar is 178 mm. The hole is thus "blind" in that it does not completely penetrate the bar. The copper can is cleaned in a nitric acid solution, followed by rinsing in water, then methanol, and finally drying.

The mixed copper and tantalum powders are gradually added to the can. At regular intervals during this process, the powders are pressed into the can using a copper ram and a pressure of approximately 35 MPa. By this process, a pack density of about 60% is achieved in the powder. When all of the powder has been added, it reaches to within approximately 13 mm of the top of the hole.

This remaining space is reserved for attachment of a copper end-cap. The end-cap is electron beam welded onto the copper can under a vacuum of $10^{-4}$ torr. Before final sealing, the billet is diffuse beam heated to 400° C. and the vacuum is pumped for two hours. This is done to ensure that the billet is fully evacuated.

The sealed billet is HIP'd at a temperature of 650° C. and a pressure of 104 MPa for four hours. The HIP serves to collapse the void space in the powder compact. The copper can is machined off the HIP'd billet. A slug of copper and tantalum powder 47.0 mm in diameter and 140 mm long is thus produced.

A second copper can, having a 50.8 mm outer diameter, a 47.5 mm inner diameter, and a length of 165 mm is cleaned as above. A section of tantalum foil, 0.102 mm thick, 140 mm wide, and 150 mm long is cleaned with acetone. The foil is inserted circumferentially into the copper can. The 140 mm dimension of the foil runs along the can length. The copper/tantalum slug is wiped clean with acetone and is then inserted into the tantalum-lined copper can. A clean copper nose and tail are TIG-welded into place, the billet is evacuated at a temperature of 427° C. to a pressure of $10^{-6}$ torr, and is then sealed.

The billet is heated for three hours at 816° C. and is then extruded to a diameter of 12.7 mm. The extruded rod is cleaned and cropped. It is then drawn at an areal reduction rate of 20% per die pass to a final diameter of 2.26 mm. At this size, the tantalum filament diameter is nominally 2.00 $\mu$m–2.36 $\mu$m, and the tantalum sheath thickness is 4.52 $\mu$m. The volume fraction of tantalum inside the sheath is about 33.3%. Subsequent processing of this composite wire is as described in Example I for the secondary composite, except that the segment length is 3.39 mm.

EXAMPLE XII

Thirty-seven holes are drilled into a copper bar. The copper bar is 50.8 mm in diameter and 191 mm long. The holes are 4.93 mm in diameter. The holes are "blind", as described in Example XI, above. They have a total length of 178 mm. The holes are distributed in symmetrical fashion across the cross section of the copper bar. A 13.0 mm deep inset is machined out at the drilled end of the bar, leaving a hole length of 165 mm. The inset is necessary for later attachment of an end-cap. The drilled copper bar is cleaned by etching in a nitric acid solution, rinsing in water, rinsing in methanol, and then drying.

Thirty-seven tantalum rods, 4.82 mm in diameter and 165 mm long, are wiped clean with acetone and are then inserted into the holes in the copper bar. A clean copper end cap is TIG-welded into place, and the billet is evacuated at a temperature of 427° C. to a pressure of $10^{-6}$ torr. The billet is then sealed.

The billet is heated for 3 hours at 816° C. and is then extruded to 12.7 mm diameter. The extruded rod is cleaned and cropped. It is then drawn at an areal reduction rate of 20% per die pass to a final diameter of 0.51 mm. This wire is chemically cleaned and is then chopped into short (about 1.0 mm) lengths by means well known in the art. The wire is chopped in a protective atmosphere of argon in order to prevent oxidation.

From this point on, the chopped wire is processed in much the same manner as were the powders of Example M. A 66.0 mm diameter hole is bored into an 82.6 mm diameter copper bar. The hole is "blind", the hole length being 143 mm, and the bar length being 156 mm. The copper can is cleaned as was the can of the primary billet. The chopped composite wire is gradually added to the can in exactly the same manner as was the copper/tantalum powder mix of Example XI. A pack density of about 60% is achieved in the chopped wire. The chopped wire is added until it reaches a height of about 130 mm, or about 13 mm below the top of the hole. A copper end-cap is electron beam welded onto the copper can under a vacuum of $10^{-4}$ torr. Before final sealing, the billet is diffuse beam heated to 400° C. and the vacuum is pumped for two hours.

The sealed billet is HIP'd and machined as described in Example XI. The composite copper/tantalum slug produced has a diameter of 47.0 mm and a length of 117 mm. A copper can, having a 50.8 mm outer diameter, a 47.5 mm inner diameter, and a length of 130 mm is cleaned as above. A section of tantalum foil, 0.102 mm thick, 117 mm wide, and 150 mm long is cleaned with acetone. The foil is inserted circumferentially into the copper can. The 117 mm dimension of the foil runs along the can length. The copper/tantalum slug is wiped clean with acetone and is then inserted into the tantalum-lined copper can. A clean copper nose and tail are TIG-welded into place, the billet is evacuated at a temperature of 427° C. to a pressure of $10^{-6}$ torr, and is then sealed.

The billet is heated for three hours at 816° C. and is then extruded to a diameter of 12.7 mm. The extruded rod is cleaned and cropped. It is then drawn at an areal reduction rate of 20% per die pass to a final diameter of 2.11 mm. At this size, the tantalum filament diameter is nominally 2.00 $\mu$m, and the tantalum sheath thickness is 4.24 $\mu$m. The volume fraction of tantalum inside the sheath is about 33.8%. Subsequent processing of this composite wire is as described in Example I for the secondary composite, except that the segment length is 3.17 mm.

In the above example, the initial copper/tantalum composite wire contains multiple tantalum filaments (37 total). It will be obvious to anyone knowledgeable in the art that a simpler configuration could be used in this embodiment of the invention. For example, a copper-clad tantalum wire could be chopped and processed much as described above. Such alternate configurations fall within the purview of the present invention.

We claim:

1. In a process of forming a porous electrolytic compact by establishing multiple valve metal components m a billet of a ductile metal, working the composite billet through a series of diameter reduction steps to form the said components into elongated elements, each said element having a thickness less than 5 microns, and moving the ductile metal from between the elongated elements, the improvement wherein said last diameter reduction step is accomplished with said elements being surrounded by a confining layer of valve metal, said layer of valve metal serving to confine the elongated elements after the removal of the ductile metal.

2. The process of claim 1, wherein the multiple valve metal components, the layer of valve metal, and a ductile metal, said ductile metal separating the valve metal components, are reduced simultaneously in several diameter reduction steps.

3. The process of claim 2, wherein the ductile metal separating the valve metal components is soluble in a mineral acid so that the ductile metal is removed by leaching in a mineral acid with the valve metal components being left intact.

4. A tubular body of valve metal confining multiple elongated valve metal elements for use as a porous electrolytic compact, each said element having a thickness less than 5 microns, said tubular body of valve metal having a wall thickness on the same order of magnitude as the thickness of elongated elements, and, said body being free of ductile metal separating said elements.

5. The process of claim 3, wherein the composite product remaining after the last reduction step is cut into short lengths less than 10 times the diameter of the product prior to the acid leaching step.

6. The process of claim 5, wherein the short lengths are immersed in a mineral acid solution to dissolve the ductile matrix metal.

7. The process of claim 5, wherein the short lengths are deformed into a non-cylindrical shape.

8. The process of claim 6, wherein the short, tubular body confining the elements is deformed into a non-cylindrical shape.

9. The process of claim 7, wherein the shape is rectangular in cross section.

10. The process of claim 6, wherein the short, tubular body confining the elements is compressed.

11. The process of claim 6, wherein the tubular body containing the elements is heated at a temperature greater than 1000° C. in vacuum.

12. The product of claim 4, wherein the tubular body and the elements are made of the same valve metal.

13. The product of claim 4, wherein the elements are formed of tantalum, and the tubular body is formed of tantalum.

14. The product of claim 4, wherein the tubular body is made from one valve metal, and the elements are made of a different valve metal.

15. The product of claim 4, wherein the elements comprise a tantalum coating on a core of niobium, niobium-titanium, niobium-tantalum, or niobium-zirconium.

16. The process of claim 1, wherein the valve metal is tantalum and the ductile metal is copper.

17. The process of claim 1, wherein the starting valve metal components comprise cylindrical bodies of compacted valve metal powder.

18. The process of claim 17, wherein the valve metal is tantalum.

19. The process of claim 1, wherein the layer of valve metal around the elements is discontinuous circumferentially.

20. The product of claim 4, wherein the tubular body is discontinuous circumferentially.

21. The process of claim 1, wherein the layer of valve metal around the elements is continuous circumferentially.

22. The product of claim 4, wherein the tubular body is continuous circumferentially.

23. The product of claim 4, wherein the tubular body is porous.

24. The process of claim 1, wherein the elongated valve metal components are formed at least partially from a perforated sheet of valve metal.

25. The process of claim 24, wherein the lateral spacing of the perforations is at least twice the thickness of the sheet.

26. The process of claim 24, wherein the valve metal sheet is expanded after perforation.

27. The process of claim 26, wherein the expanded valve metal sheet is formed into a jelly-roll by combination with a sheet of ductile metal separating the layers of valve metal.

28. The process of claim 5, wherein the layer of valve metal is sufficiently continuous circumferentially to confine the final bundle of elements when the layer and elements are cut to short lengths.

29. The process of claim 3, wherein the product from the last reduction step is cut into a length greater than its diameter and is then subjected to an acid leaching step.

30. The process of claim 29, wherein the valve metal layer has a sufficient porosity to permit passage of leaching liquid there through.

31. The process of claim 1, wherein the layer of valve metal employed in said last diameter reduction step has a thickness on the same order of magnitude as the thickness of said individual elements.

32. The product of claim 4, wherein the tubular body has a wall thickness on the same order of magnitude as the thickness of the individual elements.

33. The process of claim 1, wherein the valve metal comprises a valve metal powder, and including the step of forming the valve metal elements from said valve metal powder.

34. The process of claim 1, wherein the layer of valve metal around the elements overlaps itself, at least in part.

35. The process of claim 34, and including the step of inserting a barrier sheet so as to separate the overlap, at least in part.

36. The product of claim 4, and including a tab formed of valve metal integrally formed with said tubular body, and extending therefrom.

\* \* \* \* \*

UNITED STATES PATENT AND TRADEMARK OFFICE
CERTIFICATE OF CORRECTION

PATENT NO. : 5,869,196
DATED : February 9, 1999
INVENTOR(S) : James Wong, Mark K. Rudziak and Terence Wong It is certified that error appears in the above-identified patent and that said Letters Patent is hereby corrected as shown below:

Column 18, claim 1,
Line 48, change "m" to -- in --.
Line 52, change "moving" to -- removing --.

Signed and Sealed this

Eleventh Day of December, 2001

*Attest:*

*Attesting Officer*

NICHOLAS P. GODICI
*Acting Director of the United States Patent and Trademark Office*